(12) United States Patent
Takahashi et al.

(10) Patent No.: US 11,745,678 B2
(45) Date of Patent: Sep. 5, 2023

(54) VEHICLE POWER SUPPLY DEVICE

(71) Applicant: Honda Motor Co., Ltd., Tokyo (JP)

(72) Inventors: Masaki Takahashi, Tokyo (JP);
Naoyoshi Madoka, Tokyo (JP);
Kazuya Nakano, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 6 days.

(21) Appl. No.: 17/399,072

(22) Filed: Aug. 11, 2021

(65) Prior Publication Data

US 2022/0048451 A1 Feb. 17, 2022

(30) Foreign Application Priority Data

Aug. 12, 2020 (CN) .......................... 202021666424.9

(51) Int. Cl.
| | |
|---|---|
| *B60R 16/033* | (2006.01) |
| *B60R 16/00* | (2006.01) |
| *B60L 58/10* | (2019.01) |
| *H02J 7/00* | (2006.01) |

(52) U.S. Cl.
CPC ............ *B60R 16/033* (2013.01); *B60L 58/10* (2019.02); *B60R 16/005* (2013.01); *H02J 7/0063* (2013.01)

(58) Field of Classification Search
None
See application file for complete search history.

(56) References Cited

U.S. PATENT DOCUMENTS

| | | | | |
|---|---|---|---|---|
| 2012/0034507 A1* | 2/2012 | Harada | ............... | H01M 10/625 |
| | | | | 429/120 |
| 2013/0309539 A1* | 11/2013 | Yoshioka | ............ | H01M 50/503 |
| | | | | 29/25.03 |
| 2017/0200931 A1* | 7/2017 | DeKeuster | ............... | B60K 6/28 |

FOREIGN PATENT DOCUMENTS

JP   2019075329   5/2019

* cited by examiner

*Primary Examiner* — Jared Fureman
*Assistant Examiner* — Aqeel H Bukhari
(74) *Attorney, Agent, or Firm* — JCIPRNET

(57) ABSTRACT

Provided is a vehicle power supply device able to be fixed easily, at a reduced cost, and universally applicable. The vehicle power supply device includes: a case; a battery, disposed in the case; a cover, covering the case; a support, supporting the battery and connected with the cover; and a rivet, connecting the case and the support. A side surface of the case is provided with a case side hole penetrating into the case. The support is provided with a support side hole corresponding to the case side hole. The rivet is inserted into the case side hole and the support side hole to connect the case and the support. The cover is provided with a cover side hole connected with the case by using a bolt.

8 Claims, 5 Drawing Sheets

VEHICLE POWER SUPPLY DEVICE

CROSS-REFERENCE TO RELATED APPLICATION

This application claims the priority benefit of China application serial no. 202021666424.9, filed on August 12, 2020. The entirety of the above-mentioned patent application is hereby incorporated by reference herein and made a part of this specification.

BACKGROUND

Technical Field

The disclosure relates to a vehicle power supply device.

Description of Related Art

In the conventional art, a vehicle power supply device includes a chassis for accommodating an electric assembly (e.g., a battery module) and a cover covering the opening of the chassis to shield the electric assembly from the outside. A sealing member, such as a gasket, is provided to seal between the chassis and the cover. In addition, the chassis and the cover are connected with each other by a bolt and a nut. Accordingly, a battery device for a vehicle is able to be mounted as a whole in the vehicle and provide power. In addition, by adopting the combination of the bolt and the nut as a fixing means and providing the sealing member, such as a gasket, the battery device for the vehicle is able to be sufficiently fastened and sealed to prevent moisture from permeating the inside of the device.

However, when a vehicle power supply device is used in a region where moisture hardly permeates, since it is not required to additionally fasten and seal the power supply device to prevent moisture from permeating into the device, if the combination of the bolt and the nut is still adopted as the fixing means and the sealing member, such as a gasket, is still used like the conventional art, the number of parts including the sealing member, the bolt and the nut, etc., is high, and the cost of the vehicle power supply device is increased. While a rivet may be adopted as a fixing means to omit the use of a nut, the specification for adopting a bolt as the fixing means is different from the specification for adopting a rivet as the fixing means. If vehicle power supply devices with different specifications are manufactured to cope with the different requirements against moisture permeation in different regions, the cost is still unable to be reduced effectively.

PRIOR ART LITERATURE

Patent Document(s)

[Patent document 1] Japanese Laid-open No. 2019-75329

SUMMARY

An exemplary embodiment of the disclosure provides a vehicle power supply device. The vehicle power supply device includes: a case; a battery, disposed in the case; a cover, covering the case; a support, supporting the battery and connected with the cover; and a rivet, connecting the case and the support. A side surface of the case is provided with a case side hole penetrating into the case. The support is provided with a support side hole corresponding to the case side hole. The rivet is inserted into the case side hole and the support side hole to connect the case and the support. The cover is provided with a cover side hole connected with the case by using a bolt.

DESCRIPTION OF THE EMBODIMENTS

Figure 1:
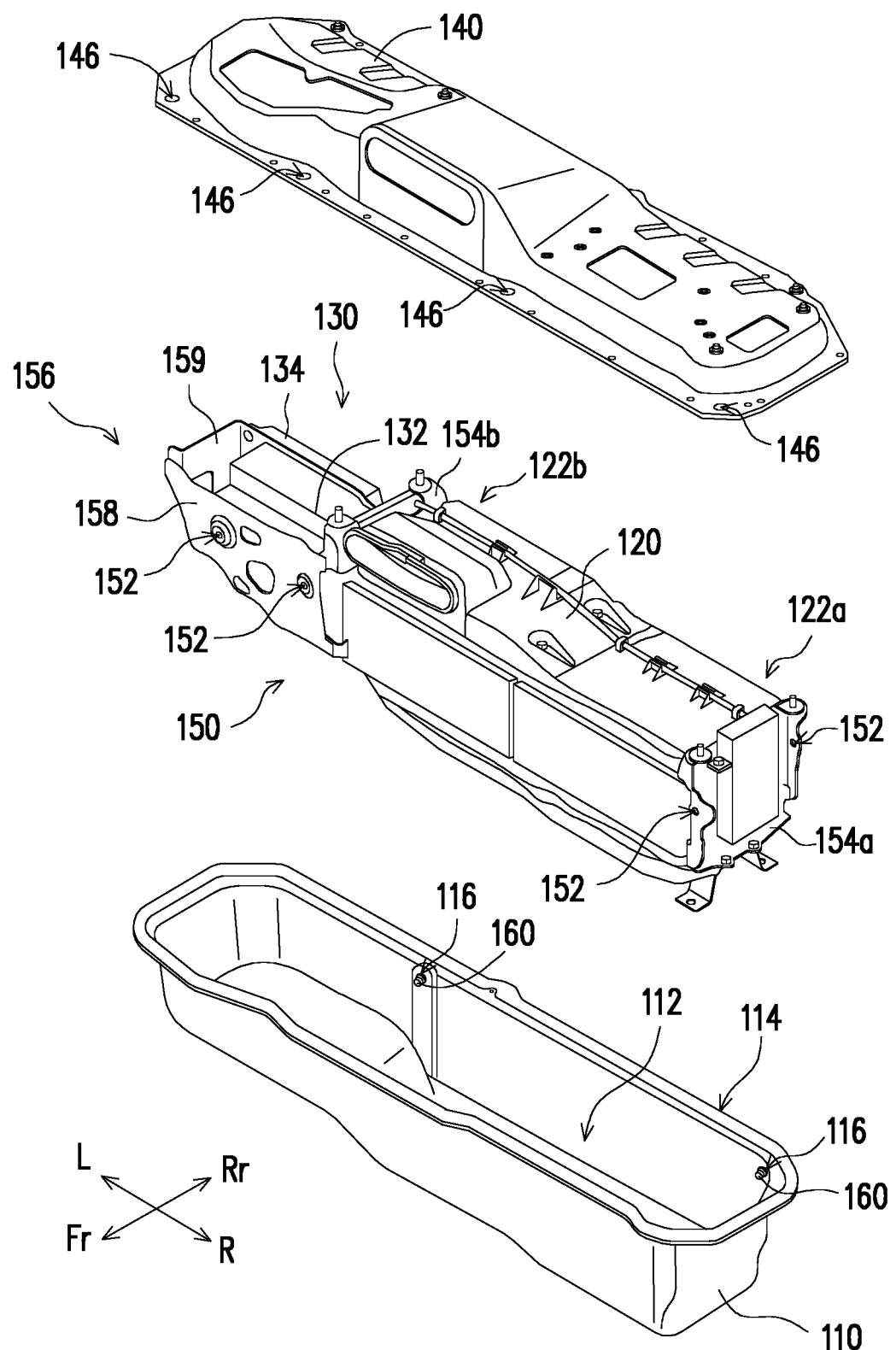
FIG. 1 is a schematic exploded view illustrating a vehicle power supply device according to an embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

Provided is a vehicle power supply device able to be fixed easily, at a reduced cost, and universally applicable.

An exemplary embodiment of the disclosure provides a vehicle power supply device. The vehicle power supply device includes: a case; a battery, disposed in the case; a cover, covering the case; a support, supporting the battery and connected with the cover; and a rivet, connecting the case and the support. A side surface of the case is provided with a case side hole penetrating into the case. The support is provided with a support side hole corresponding to the case side hole. The rivet is inserted into the case side hole and the support side hole to connect the case and the support. The cover is provided with a cover side hole connected with the case by using a bolt.

According to an embodiment of the disclosure, the support is provided with the support side holes on two sides in a vehicle front-rear direction.

According to an embodiment of the disclosure, the vehicle power supply device further includes: an electronic component, disposed side-by-side with the battery. The support is provided with a side frame supporting an end of the battery and an electronic component frame connected with the side frame and supporting the electronic component. The side frame and the electronic component frame are provided with the support side holes.

According to an embodiment of the disclosure, the electronic component frame is provided with a plate made of metal, the plate is provided between the case and the electronic component and extends along a vehicle width direction when the vehicle power supply device is mounted to a vehicle, and the support side holes are provided on the plate.

According to an embodiment of the disclosure, the electronic component includes: a switch, carrying out on/off related to the battery; and a controller, controlling the battery or the switch. The electronic component frame includes a two-side support supporting the switch and the controller on two sides, and the switch is sandwiched between the plate and the two-side support.

Based on the above, in the vehicle power supply device according to the embodiments of the disclosure, when the vehicle power supply device is used in a region where moisture hardly permeates, by adopting the rivet, as the fixing means, to pass through the case side hole and the support side hole, the case and the support are able to be connected, and the cover is able to be further connected. Accordingly, the use of a nut is able to be omitted, and the number of parts is reduced. Moreover, when the vehicle power supply device is used in a region where moisture easily permeates, since the cover is provided with the cover side hole, without replacing the structure, the bolt is able to serve as a fixing means to connect the case and the cover through the cover side hole, thereby reinforcing the fastening effect. Accordingly, the vehicle power supply device of the same structure may be adopted universally, and it is not necessary to provide two different specifications/structures, which may increase the cost, to cope with the needs for water-proof in different regions. Thus, the vehicle power supply device according to the embodiments of the disclosure is able to be fixed in a simple and low-cost manner. In addition, the vehicle power supply device is universally applicable.

Figure 2:
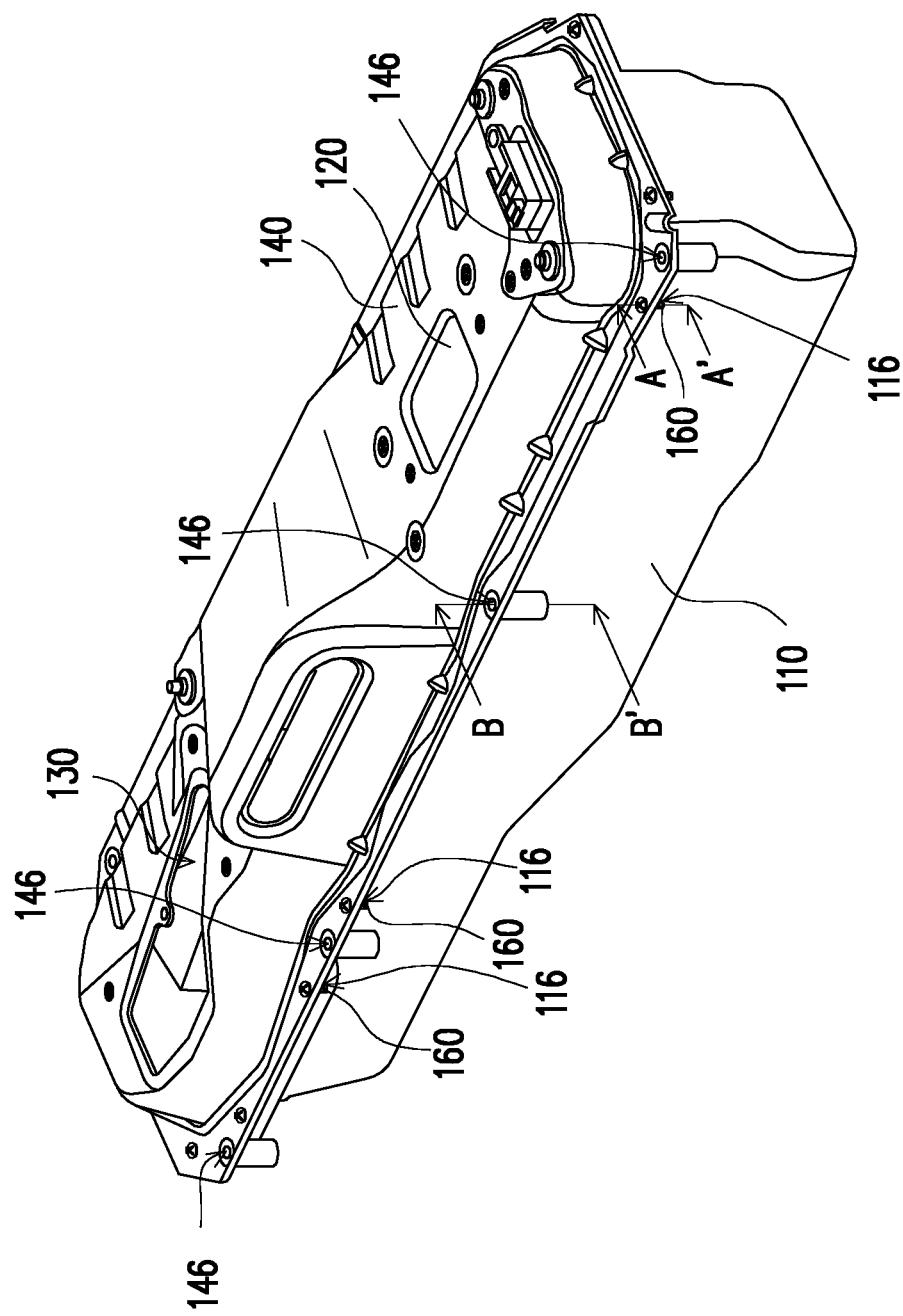
FIG. 2 is a schematic perspective view illustrating the vehicle power supply device shown in FIG. 1.
Figure 3:
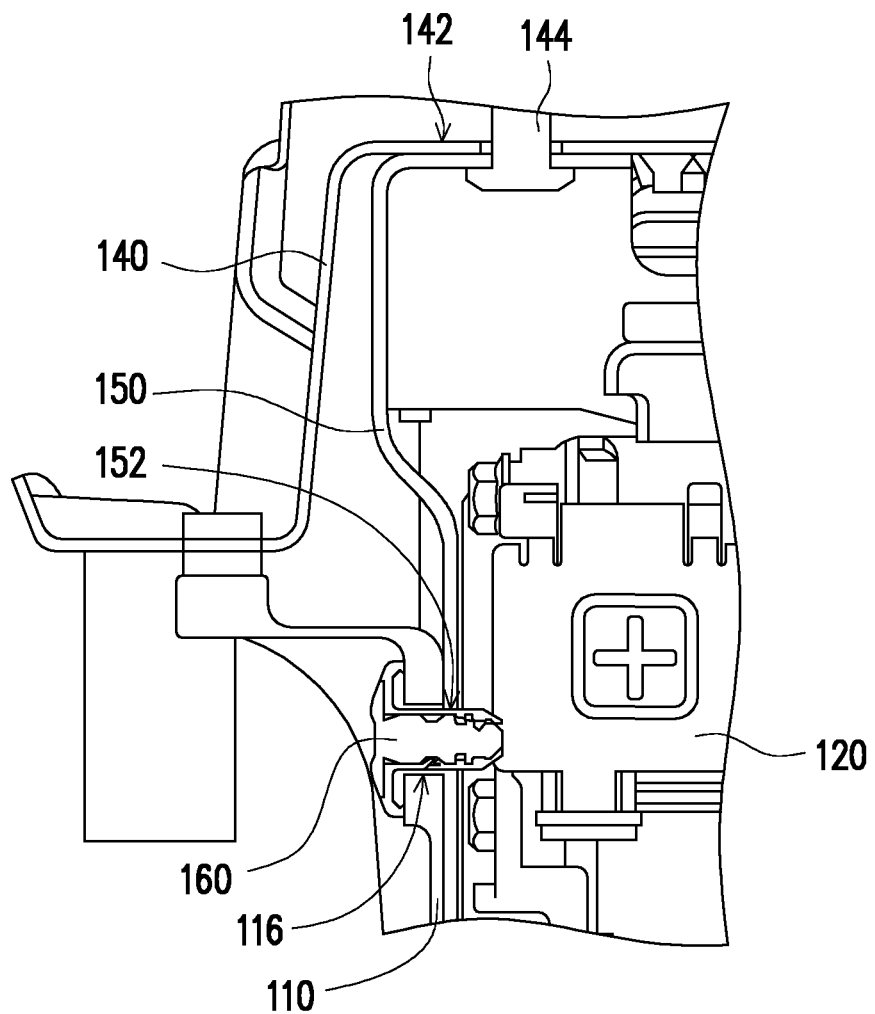
FIG. 3 is a cross-sectional view of the vehicle power supply device shown in FIG. 1.
Figure 4:
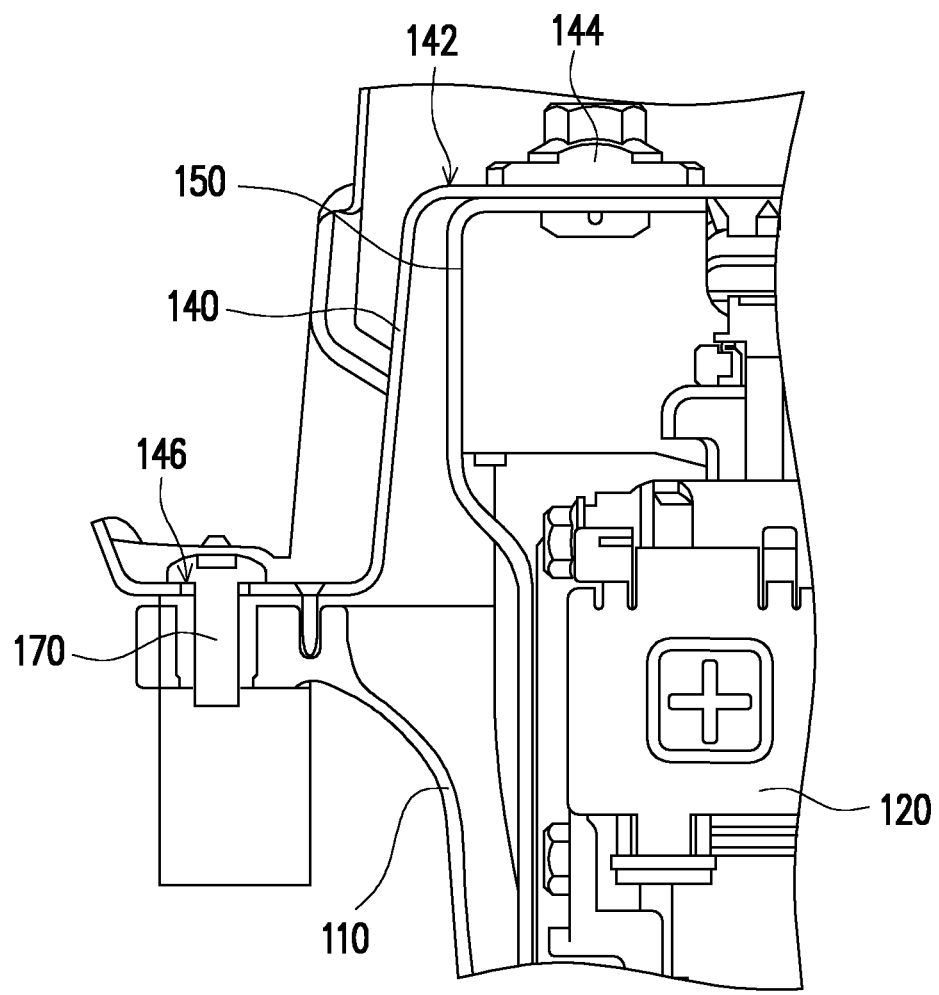
FIG. 4 is a cross-sectional view of the vehicle power supply device shown in FIG. 1.
Figure 5:
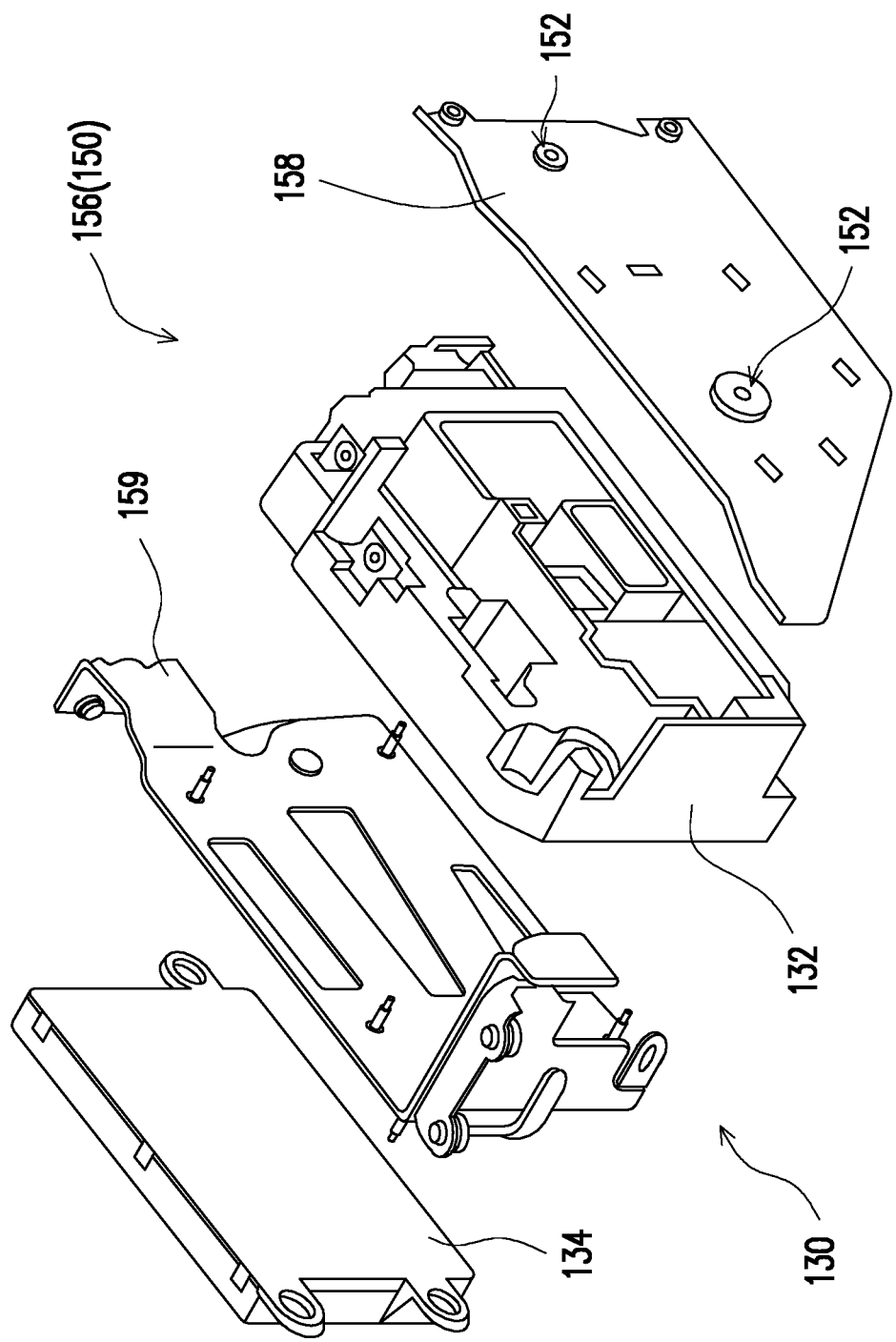
FIG. 5 is a schematic exploded view of an electronic component adopted in the vehicle power supply device shown in FIG. 1.

FIG. 1 is a schematic exploded view illustrating a vehicle power supply device according to an embodiment of the disclosure. FIG. 2 is a schematic perspective view illustrating the vehicle power supply device shown in FIG. 1. FIG. 3 is a cross-sectional view of the vehicle power supply device shown in FIG. 1. FIG. 4 is a cross-sectional view of the vehicle power supply device shown in FIG. 1. FIG. 5 is a schematic exploded view of an electronic component adopted in the vehicle power supply device shown in FIG. 1. In the embodiment, a vehicle power supply device 100 is capable of being mounted in a vehicle not shown herein. However, the disclosure is not particularly limited by the purpose for which the vehicle power supply device 100 is applied. Such purpose may be adjusted according to needs. In the following, the overall configuration and an embodiment of the vehicle power supply device 100, which serves as an example, will be described with reference to FIGS. 1 to 5.

Specifically, as shown in FIGS. 1 and 2, in the embodiment, the vehicle power supply device 100 includes a case 110, a battery 120, an electronic component 130, a cover 140, a support 150, and a rivet 160. The case 110 has an accommodating space 112 and an opening for communicating between the accommodating space 112 and the outside. The battery 120 may be placed into the accommodating space 112 through the opening 114 and disposed inside the case 110. The electronic component 130 is disposed side-by-side with the battery 120 and also accommodated in the case 110. The cover 140 covers the opening 114 of the case 110 to shield the battery 120 and the electronic component 130 accommodated in the accommodating space 112 from the outside. In addition, as shown in FIGS. 3 and 4, the support 150 supports the battery 120 and is located in the case 110, and is connected with the cover 140 through a fixer 144, such as a bolt, at a top part 142 of the cover 140. Similarly, the case 110 is further connected with the cover 140. Accordingly, the vehicle power supply device 100 is capable of being mounted as a whole in the vehicle to supply power. However, the disclosure is not particularly limited by the specific structure of the vehicle power supply device 100. The specific structure of the vehicle power supply device 100 may be adjusted according to needs.

In the embodiment, as a connection means of the case 110 and the cover 140, as shown in FIG. 3, the rivet 160 is provided to connect the case 110 and the support 150. Accordingly, the case 110 connected with the support 150 also establishes a connection relationship with the cover 140 connected with the support 150. Specifically, a case side hole 116 penetrating into the case 110 is provided on the side surface of the case 110. The support 150 is provided with a support side hole 152 corresponding to the case side hole 116. The rivet 160 is inserted into the case side hole 116 and the support side hole 152 to connect the case 110 and the support 150. At this time, due to the connection relationship (i.e., the fixer 144) established between the support 150 and the cover 140, the case 110, the cover 140, and the support 150 are fixed together. In addition, as shown in FIG. 4, a cover side hole 146 is provided on the cover 140 for connection with the case 110 by using a bolt 170. Therefore, as a connection means of the case 110 and the cover 140, the bolt 170 may also be adopted to connect the case 110 and the cover 140.

Accordingly, when the vehicle power supply device 100 is used in a region where moisture hardly permeates, i.e., a region where the needs for water-proof are low, the fastening and sealing effects as required are able to be achieved by arranging the rivet 160, as the fixing means, to pass through the case side hole 116 and the support side hole 152 to connect the case 110 and the support 150 and further connect the case 110 and the cover 140 through the support 150, thereby fixing the case 110, the cover 140, and the support 150 together. At this time, the use of a nut is able to be omitted to reduce the number of parts. Besides, an additional bolt for fixing at the cover side hole 146 is not required, either. In other words, even though the cover 140 is provided with the cover side hole 146, a bolt provided at the cover side hole 146 is not a required structure of the vehicle power supply device 100.

Comparatively, when the vehicle power supply device 100 is used in a region where moisture permeates easily, i.e., a region where the needs for water-proof are high, the fastening and sealing effects as required are able to be achieved by arranging the bolt 170, as a fixing means, to pass through the cover side hole 146 and be locked into the case 110 to connect the case 110 and the cover 140, thereby fixing the case 110, the cover 140, and the support 150 together. In a preferred embodiment of the disclosure, the bolt 170 may be further adopted as a fixing means to pass through the cover side hole 146 and be locked into the case 110 to connect the case 110 and the cover 140 on the basis that the rivet 160 is adopted as a fixing means to pass through the case side hole 116 and the support side hole 152 to connect the case 110 and the support 150, so as to facilitate the fixing and sealing effects. Nevertheless, in other modified embodiments of the disclosure, the use of the rivet 160 may be omitted based on needs. That is, in other embodiments, only the bolt 170 is adopted as the fixing means to pass through the cover side hole 146 and be locked into the case 110 to connect the case 110 and the cover 140. The disclosure is not particularly limited in this regard.

Therefore, in the embodiment, as the connection means of the case 110, the support 150, and the cover 140, holes with two specifications (for the rivet as well as the bolt) are provided in the vehicle power supply device 100. When the vehicle power supply device 100 is used in a region where moisture hardly permeates, the rivet 160, whose cost is low, is able to be adopted as the fixing means to omit the use of a nut and reduce the number of parts. When the vehicle power supply device 100 is used in a region where moisture permeates easily, it is not necessary to replace the cover 140 with a cover 140 of another structure, which may increase the cost, to facilitate the fastening and sealing effects, but is only required to fix the cover 140 on which the cover side hole 146 is provided by using the bolt 170. Accordingly, the vehicle power supply device 100 of the same structure may be applied universally, and it is not necessary to provide two different specifications/structures, which may increase the cost, to cope with the needs for water-proof in different regions.

Referring to FIG. 1 again, in the embodiment, the support 150 is provided with side frames 154*a* and 154*b* supporting ends 122*a* and 122*b* of the battery 120 and an electronic component frame 156 connected with the side frame 154*b* and supporting the electronic component 130. The battery 120 and the electronic component 130 are arranged side-by-side in the vehicle width direction (i.e., a vehicle right direction R and a vehicle left direction L). Therefore, the side frames 154*a* and 154*b* and the electronic component frame 156 are also arranged along the vehicle width direction (i.e., the vehicle right direction R and the vehicle left direction L). However, the disclosure is not particularly limited by the structure of the support 150 and the support means of the battery 120 and the electronic component 130. The structure of the support 150 and the support means of the battery 120 and the electronic component 130 may be adjusted based on needs.

In the embodiment, the support 150 is provided with the support side holes 152 on the two sides in the vehicle front-rear direction (i.e., a vehicle front direction Fr and a vehicle rear direction Rr), and the side frames 154*a* and 154*b* and the electronic component frame 156 arranged on the two sides of the vehicle width direction (i.e., the vehicle right direction R and the vehicle left direction L) are provided with the support side holes 152. In other words, multiple support side holes 152 are disposed on the support 150, such as being arranged on the two sides in the vehicle front-rear direction (i.e., the vehicle front direction Fr and the vehicle rear direction Rr) and the two sides of the vehicle width direction (i.e., the vehicle right direction R and the vehicle left direction L), that is, the side frames 154*a* and 154*b* and the electronic component frame 156.

As an example, five support side holes 152 are provided in the embodiment. More specifically, one support side hole 152 (as shown in FIG. 1) is provided on each side of the vehicle front direction Fr and the vehicle rear direction Rr of the side frame 154*a* supporting the end 122*a* of battery 120, one support side hole 152 (not shown in FIG. 1, for being hidden in the rear of the battery 120) is provided on the side of the vehicle rear direction Rr of the side frame 154*b* supporting the end 122*b* of the battery 120, and two support side holes 152 (as shown in FIG. 1) are provided on the side of the vehicle front direction Fr of the electronic component frame 156. In correspondence with the positions and the quantity of the support side holes 152, five case side holes 116 (FIG. 1 illustrates two case side holes 116 provided on the side of the vehicle rear direction Rr, FIG. 2 illustrates two case side holes 116 provided on the side of the vehicle front direction Fr) are also provided on the case 110, and the case side holes 116 and the support side holes 152 are correspondingly arranged as shown in FIG. 3.

Accordingly, the case side holes 116 and the support side holes 152 are disposed on the two sides (i.e., the vehicle front direction Fr and the vehicle rear direction Rr) of the vehicle front-rear direction and the two sides (i.e., the vehicle right direction R and the vehicle left direction L) of the vehicle width direction, i.e., the side frames 154*a* and 154*b* and the electronic component frame 156. By inserting the rivets 160 into the case side holes 116 and the support side holes 152, a connection relationship is established on the two sides (i.e., the vehicle front direction Fr and the vehicle rear direction Rr) of the vehicle front-rear direction and the two sides (i.e., the vehicle right direction R and the vehicle rear direction L) of the vehicle width direction. Accordingly, the case 110 and the support 150 are able to be fixed favorably. However, the quantities and the positions of the case side holes 116 and the support side holes 152 may be adjusted based on needs. The disclosure is not particularly limited in this regard.

Furthermore, in the embodiment, as shown in FIG. 1, the electronic component frame 156 has a plate 158 made of metal. The plate 158 faces the vehicle front direction Fr and is disposed between the case 110 and the electronic component 130 (shown in FIG. 1), and extends along the vehicle width direction (i.e., the vehicle right direction R and the vehicle left direction L) when the vehicle power supply device 100 is mounted to a vehicle (not shown). Accordingly, the two support side holes 152 of the electronic component frame 156 provided in the vehicle front direction Fr are provided on the plate 158. Consequently, an electric field, a magnetic field, etc., generated by the electronic component 130 is able to be blocked by the plate 158 made of metal, and the influences of the electric field, magnetic field, etc., on other devices may thus be suppressed. Nevertheless, the disclosure is not particularly limited by the structure and the material of the electronic component frame 156. The structure and the material of the electronic component 156 may be adjusted based on needs.

Referring to FIG. 5, in the embodiment, the electronic component 130 includes a switch 132 and a controller 134. The switch 132 carries out on/off related to the battery 120. For example, the switch 132 may turn off the circuit of the battery 120 when the vehicle is stopped or when the vehicle is hit, or the switch 132 may turn on/off the battery 120 when the battery 120 supplies power to other components. The controller 134 is, for example, an electronic control unit (ECU), and controls the battery 120 or the switch 132. However, the disclosure is not particularly limited by the types of the switch 132 and the controller 134, and is not particularly limited by the configuration of the electronic component 130, either. The types of the switch 132 and the controller 134 and the configuration of the electronic component 130 may be adjusted based on needs.

Moreover, in the embodiment, the electronic component frame 156 includes a two-side support 159 supporting the switch 132 and the controller 134 on two sides. In other words, the switch 132 and the controller 134 are provided on two opposite sides (e.g., the switch 132 is provided in correspondence with the vehicle front direction Fr and the controller 134 is provided in correspondence with the vehicle rear direction Rr) of the support 159. Therefore, the switch 132 and the controller 134 are able to be connected together through the support of the two-side support 159. Moreover, the switch 132 is sandwiched between the plate 158 and the two-side support 159. Accordingly, not only is the electronic component 130 able to be effectively supported by the two-side support 159, the electric field, the magnetic field, etc., generated by the electronic component 130 is able to be effectively blocked by the plate 158 made of metal. However, the disclosure is not particularly limited by the structure of the electronic component frame 156 and the support means of the electronic component 130. The structure of the electronic component frame 156 and the support means of the electronic component 130 may be adjusted based on needs.

In view of the foregoing, in the vehicle power supply device according to the embodiments of the disclosure, the case side hole penetrating into the case is provided on the side surface of the case, the support side hole corresponding to the case side hole is provided on the support. The rivet is inserted into the case side hole and the support side hole to connect the case and the support. Accordingly, the case is connected with the cover through the support. Moreover, the cover is provided with the cover side hole, through which the cover is connected with the case by using the bolt. When the vehicle power supply device is used in a region where moisture hardly permeates, by adopting the rivet, as the fixing means, to pass through the case side hole and the support side hole, the case and the support are able to be connected, and the cover is able to be further connected. Accordingly, the use of a nut is able to be omitted, and the number of parts is reduced. Moreover, when the vehicle power supply device is used in a region where moisture easily permeates, since the cover is provided with the cover side hole, without replacing the structure, the bolt is able to serve as a fixing means to connect the case and the cover through the cover side hole, thereby reinforcing the fastening effect. Accordingly, the vehicle power supply device of the same structure may be adopted universally, and it is not necessary to provide two different specifications/structures, which may increase the cost, to cope with the needs for water-proof in different regions. Thus, the vehicle power supply device according to the embodiments of the disclosure is able to be fixed in a simple and low-cost manner. In addition, the vehicle power supply device is universally applicable.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A vehicle power supply device, comprising:
   a case;
   a battery, disposed in the case;
   a cover, covering the case;
   a support, supporting the battery and connected with the cover; and
   a rivet, connecting the case and the support,
   wherein a side surface of the case is provided with a case side hole penetrating into the case,
   the support is provided with a support side hole corresponding to the case side hole,
   the rivet is inserted into the case side hole and the support side hole to connect the case and the support, and
   the cover is provided with a cover side hole connected with the case by using a bolt.

2. The vehicle power supply device as claimed in claim 1, wherein the support is provided with the support side holes on two sides in a vehicle front-rear direction.

3. The vehicle power supply device as claimed in claim 2, further comprising:
   an electronic component, disposed side-by-side with the battery,
   wherein the support is provided with a side frame supporting an end of the battery and an electronic component frame connected with the side frame and supporting the electronic component, and
   the side frame and the electronic component frame are provided with the support side holes.

4. The vehicle power supply device as claimed in claim 3,
   the electronic component frame is provided with a plate made of metal,
   the plate is provided between the case and the electronic component and extends along a vehicle width direction when the vehicle power supply device is mounted to a vehicle, and
   the support side holes are provided on the plate.

5. The vehicle power supply device as claimed in claim 4, wherein the electronic component comprises:
   a switch, carrying out on/off related to the battery; and
   a controller, controlling the battery or the switch,
   wherein the electronic component frame comprises a two-side support supporting the switch and the controller on two sides, and the switch is sandwiched between the plate and the two-side support.

6. The vehicle power supply device as claimed in claim 1, further comprising:
   an electronic component, disposed side-by-side with the battery,
   wherein the support is provided with a side frame supporting an end of the battery
   and an electronic component frame connected with the side frame and supporting the electronic component, and
   the side frame and the electronic component frame are provided with the support side holes.

7. The vehicle power supply device as claimed in claim 6,
   the electronic component frame is provided with a plate made of metal,
   the plate is provided between the case and the electronic component and extends along a vehicle width direction when the vehicle power supply device is mounted to a vehicle, and
   the support side holes are provided on the plate.

8. The vehicle power supply device as claimed in claim 7, wherein the electronic component comprises:
   a switch, carrying out on/off related to the battery; and
   a controller, controlling the battery or the switch,
   wherein the electronic component frame comprises a two-side support supporting the switch and the controller on two sides, and the switch is sandwiched between the plate and the two-side support.

* * * * *